US005425582A

United States Patent [19]

Asano et al.

[11] Patent Number: 5,425,582

[45] Date of Patent: Jun. 20, 1995

[54] THERMAL DETECTOR AND METHOD OF PRODUCING THE SAME

[75] Inventors: Isao Asano, Tokyo; Yoshimi Kawabata, Hachiouji, both of Japan

[73] Assignee: Hochiki Kabushiki Kaisha, Tokyo, Japan

[21] Appl. No.: 5,889

[22] Filed: Jan. 15, 1993

[30] Foreign Application Priority Data

Jan. 31, 1992 [JP] Japan .................................. 4-015703
Mar. 18, 1992 [JP] Japan .................................. 4-060820

[51] Int. Cl.[6] .............................................. G01K 1/08

[52] U.S. Cl. .................................... 374/208; 340/693; 340/584; 374/183

[58] Field of Search ............... 374/168, 208, 185, 183, 374/179, 209; 340/584, 628, 693; 29/612, 613, 837, 838, 839, 841

[56] References Cited

U.S. PATENT DOCUMENTS

| | | | |
|---|---|---|---|
| Re 34,599 | 5/1994 | Suszynski | 374/209 |
| 3,513,432 | 5/1970 | Davis | 374/179 |
| 3,580,078 | 5/1971 | MacKenzie | 374/179 |
| 4,018,624 | 4/1977 | Rizzolo | 374/179 |
| 4,053,785 | 10/1977 | Lee et al. | 340/785 |
| 4,092,641 | 5/1978 | Bellinghausen et al. | 340/628 |
| 4,117,926 | 10/1978 | Turner et al. | 374/209 |
| 4,388,617 | 6/1983 | Nakanishi et al. | 340/693 |
| 4,674,555 | 6/1987 | Plata | 374/179 |
| 4,694,285 | 9/1987 | Scripps | 340/693 |
| 4,929,093 | 5/1990 | Suzuki et al. | 374/208 |
| 5,216,805 | 6/1993 | Hallenbeck et al. | 29/841 |

*Primary Examiner*—William A. Cuchlinski, Jr.
*Assistant Examiner*—G. Bradley Bennett
*Attorney, Agent, or Firm*—Max Fogiel

[57] ABSTRACT

A thermal detector comprises: an element unit 11 having a heat sensor element 1 such as a thermistor sealed into the terminal end portion thereof, for electrically detecting temperature change; a detector body integrating by means of plastic-forming a pair of fitting members 12 for electrically and mechanically coupling to a detector base; a circuit board 16 mounted on a circuit accommodation portion 15 inside the detector body; and a back side cover 17 for closing and sealing the circuit accommodation portion 15 from the reverse side thereof. Thereby, airtightness of the circuit accommodation portion is secured and it is simplified to make possible automatization thereof. Also, positioning projections 110, 112, 114 and positioning grooves 111, 113, 115 are provided. By respectively fitting these, positioning of the circuit board 16 to a molded body 14, the back side cover 17 to the reverse side of the molded body 14 and the outer cover 13 to the lower side of the molded body 14 is effected. The back side cover 17, the circuit board 16, the molded body 14 and the outer cover 13 in such positioned state are fixed into one body by means of screwing of the fitting members 12. Thereby positioning of a plurality of component parts at the time of assembling is simplified to achieve an improvement in working efficiency and assembling precision.

8 Claims, 6 Drawing Sheets

THERMAL DETECTOR AND METHOD OF PRODUCING THE SAME

BACKGROUND OF THE INVENTION

1. Field of the Invention

The present invention relates to thermal detector and method of producing the same using a semiconductor heat sensor element such as a thermistor which senses a fire by electrically detecting temperature.

2. Description of the Related Art

Those for example disclosed in Japanese Patent Laid-Open Publication No.1-259494 have been known as this type of thermal detector and its production method.

This type of thermal detector is first provided with a printed circuit board having a heat sensor element and a body for accommodating the printed circuit board. Also, a cover is provided so that the heat sensor element of the printed circuit board mounted on the body is caused to face the outside thereof. It is further constructed to have an inner cover placed between the printed circuit board and the cover, which is screwed to the printed board. The inner cover is provided for the purpose of positioning the heat sensor element which penetrates therethrough and for the purpose of preventing dust from entering.

One example shown in FIG. 11 is conventionally know as this type of detector. Referring to FIG. 11, what is denoted by numeral 1 is a heat sensor element using a thermistor or the like of which the resistance value varies according to temperature. This heat sensor element 1 has lead wire connected to a printed circuit board 4 which is incorporated into a circuit accommodation portion 3 of a detector body 2 where the summit thereof is brought to the outside. The heat sensor element 1 and the portion of a hole on the detector body 2 through which the element is brought to the outside are formed into a sealed portion 5 by means of potting of adhesives or the like. It should be noted that, instead of potting of adhesives, a packing may be used.

A back side cover 6 is mounted on the reverse side of the circuit accommodation portion 3 via a rubber packing 7 or the like. Provided on the reverse side of the back side cover 6 are a pair of fitting members 8 which are electrically and mechanically connected to a detector base.

Mounting of the printed circuit board 4 and the fitting members 8 onto the back side cover 6 is effected by using screws 9 and cylindrical contacting members 10. That is, they are fixed to the back side cover 6 by tightening the screw 9 in the state where the contacting member 8 is placed between the printed circuit board 4 and the fitting member 10.

However, in the construction of a conventional sensor, there are problems, as follows:

Firstly, a conventional sensor is constructed to have an airtight structure by using potting or packing in the state where the heat sensor element 1 connected to the circuit board 4 by thin lead wire is brought out to the outside thereof so as to keep the airtightness of the circuit accommodation portion 3. For this reason, manual work must be performed, since the lead wire of the heat sensor element 1 is thin and is difficult to handle. Thus, automatization of assembling process thereof is difficult. Further, in the case of potting where adhesives or the like is used, time is also required until it is dried and fixed.

Secondly, mounting of the circuit board 4 and the fitting member 8 with respect to the back side cover 6 is also performed by a manual operation, because the screw 10 is used. Further, a gap occurs at the mounting portion. Airtightness within the detector cannot thus be adequately secured.

Thirdly, in assembling of body, printed circuit board and cover of a conventional thermal detector, they are fixed by means of screw in the state where threaded holes and threaded through holes formed respectively on them are positioned with respect to each other. For this reason, screwing operation must be performed at the same time of their positioning. Assembling operation of the detector is thus complicated and, in addition, variance in positioning due to the condition of screwing is large. Especially when automatization of assembling work by a robot or the like is attempted, the yield of products is also reduced, since the working process thereof is complicated and requires high positioning accuracy.

SUMMARY OF THE INVENTION

The present invention has been made in view of the above conventional problems, and it is an object of the present invention to provide a thermal detector and method of producing the same in which airtightness of a circuit accommodation portion is secured and positioning of a plurality of parts in assembling work is simplified to improve working efficiency and assembling precision and thereby to make possible an. automatization thereof. To this end, the present invention is constructed as follows: Note that the reference numerals that are used in the drawings are additionally indicated in the following.

First, the present invention includes an element unit 11 having a heat sensor element 1 such as a thermistor sealed into the terminal end portion thereof for electrically detecting changes in temperature. The element unit 11 is integrally plastic-formed in the state where the terminal end thereof is exposed to the outside. Here, preferably, a pair of fitting members 12 positioned at the inner side thereof for electrically and mechanically coupling the element to a detector base are at the same time integrated thereto as they are plastic-formed. Further, a detector body (having an outer cover 13 and molded body 14) containing these components is included. In addition, it includes: a circuit board 16 mounted on the circuit accommodation portion 15 inside the detector body and having thereon a sensor circuit electrically connected to the element unit 11 and the fitting members 12; and a back side cover 17 for sealing the circuit accommodation portion 15 of the detector body from the back side thereof.

In another aspect, the present invention preferably includes: an element unit 11 having a heat sensor element 1 such as a thermistor sealed into the terminal end portion thereof for electrically detecting changes in temperature; and a detector body 18 to which the terminal end of the element unit 11 is integrated by means of plastic forming in the state where it is exposed to the outside. It further includes a circuit board 16 mounted on a circuit accommodation portion 15 inside the detector body 18 and having thereon a sensor circuit electrically connected to the above element unit and fitting members. In addition to these, it includes a back side cover 17 having a pair of fitting members 12 integrally formed thereon by means of plastic forming for electrically and mechanically coupling it to the detector base, for sealing in the above state the circuit accommodation portion 15 of the detector body 18 from the reverse side thereof.

The back side cover 17 having the fitting members 12 integrally formed thereon by means of plastic forming furthermore has a shield plate 19 internally embedded therein by means of plastic forming, which is electrically connected to one of the fitting members 12.

Furthermore, the element unit 11 comprises: a pair of lead frames 20; a unit body 21 plastic-formed by exposing the two ends of the lead frames 20 to the outside; a heat sensor element 1 projecting at the terminal end of the unit body 21, formed by connecting lead wire to the pair of the lead frames; and a coating material 23 provided to cover the entire portion of the heat sensor element 1 and lead wire 22 that are provided at the terminal end side of the unit body 21.

According to the detector of the present invention having the above construction, an element unit having a heat sensor element and fitting members are previously plastic-formed to be prepared as one component part integrally with a detector body and a back side cover by means of insert molding. Thus, assembling work of the heat sensor element and fitting members onto the detector body becomes unnecessary so that automatization of assembling may be achieved.

Further, since the element unit and the fitting members are integrated to the detector body by means of insert molding, it is possible to further increase airtightness of the circuit accommodation portion so as to greatly improve durability and reliability of the detector.

In another aspect, a thermal detector of the present invention is preferably constructed and manufactured as follows:

First, as its construction, the present invention is directed toward a detector having an assembled structure including components parts placed one upon another in the order of: an outer cover 13, a molded body 14 having a heat sensor element 1 integrally formed thereon projected to the outside; circuit board 16 having a sensor circuit thereon; and a back side cover 17 having fitting members 12. Note that, preferably, it is also directed toward one having a shield case 45.

In a thermal detector as constructed above, the present invention includes: a first positioning projection 110 provided on one of the reverse sides of the molded body 14 or the circuit board 16; and a first positioning groove 111 provided on the other, which may be fitted onto the first positioning projection 110.

It further includes: a second positioning projection 112 provided on one side of the molded body 14 and the back side cover 17; and a second positioning groove 113 which may be fitted onto the second positioning projection 112.

Furthermore, a third positioning groove 115 is provided on one side of the molded body 14 and the outer cover 13. Then, the circuit board 16 is attached to the molded body 14 as they are positioned based on fitting of the first positioning projection 110 and the first positioning groove 111.

In addition, the outer cover 13 is attached to the lower side of the molded body 14 as they are positioned based on fitting of the third positioning projection 114 and the third positioning groove 115.

In this positioned state, the detector has its construction in which the back side cover 17, the shield case 45, the circuit board 16, the molded body 14 and the outer cover 13 are integrally fixed to each other by screwing of the fitting members 12 with respect to the back side cover 17.

Moreover, the present invention provides method of producing a thermal detector having the above construction, which comprises the following steps:

Step 1

The circuit board 16 is temporarily assembled with the molded body 14 by positioning them based on fitting of the first positioning projection 110 and the first positioning groove 111.

Step 2

The back side cover 17 having the shield case 45 incorporated thereto is temporarily assembled onto the reverse side of the molded body 14 having the circuit board 16 incorporated thereto by positioning them based on fitting of the second positioning projection 112 and the second positioning groove 113.

Step 3

The outer cover 13 is temporarily assembled onto the lower side of the molded body 14 by positioning them based on fitting of the third positioning projection 114 and the third positioning groove 115.

Step 4

The back side cover 17, the shield case 45, the circuit board 16, the molded body 14 and the outer cover 13, in their temporarily assembled state, are fixed integrally to each other by means of screws.

According to a thermal detector of the present invention constructed as above, each combination of the body and the circuit board, the body and the back side cover, and the body and the outer cover may be accurately positioned in their temporarily assembled state based on fitting between their respective positioning projections and positioning grooves. After such temporary assembling, the entire portions may thus be assembled and fixed into one through a fixing operation, for example, onto the back side cover by means of tapping screws of the fitting members while they are kept in their correct relative position. Due to the fact that positioning is separated from fixing operation based on final screwing, positioning at the time of assembling may be performed simply and accurately. In addition, positioning may be performed at the temporary assembling prior to screwing operation, and screwing may be performed finally after the positioning which is performed as a temporary assembling work. Application of automatic assembling by a robot or the like is thus facilitated, and it is possible to constantly obtain a high assembling accuracy, and, in addition, the yield of products may be improved.

DESCRIPTION OF THE PREFERRED EMBODIMENTS

Figure 1:
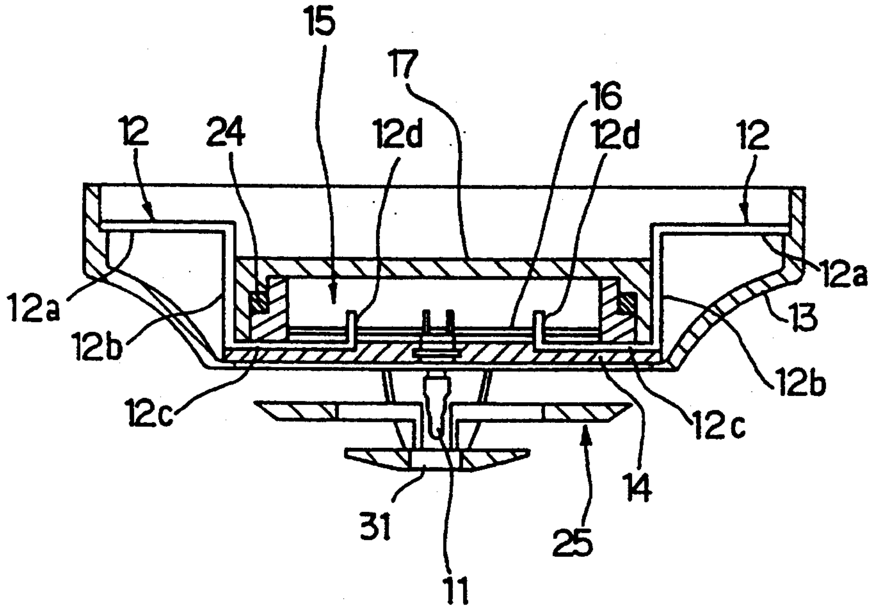
FIG. 1 is a sectional view (taken along A—A of FIG. 3) showing a first embodiment of the present invention.

FIG. 1 is a sectional view showing a first embodiment of the present invention.

Referring to FIG. 1, numeral 11 denotes an element unit into the interior of which a heat sensor element such as a thermistor is sealed. The element unit 11 is plastic-formed integrally with a molded body 14 by means of inset molding in the state where the terminal end thereof containing the heat sensor element is projected outward at the center of the molded body 14. Further, a pair of fitting members 12, to be electrically and mechanically coupled to a detector base provided on the ceiling surface, are also integrally plastic-formed with the molded body 14 by means of insert molding.

Each fitting member 12 has a shape bent generally perpendicularly consisting of a horizontal portion 12*a*, a vertical portion 12*b*, a horizontal portion 12*c* and a vertical portion 12*d* extended from outside in this order. The horizontal portion 12*a* at the upper outside is fitted into a fitting member of the detector base. Further, the inner vertical portion 12*b* is projected into a circuit accommodation portion 15 formed at the interior of the molded body 14 and passes through a circuit board 16 to be soldered thereat.

Such a fitting member 12 is integrated at its horizontal portion 12*c* by insert molding to the molded body 14 when the body is plastic-formed.

A suitable sensor circuit is implemented on the circuit board which is incorporated into the circuit accommodation portion 15 of the molded body 14. Further, lead terminals on the back of the element unit 11 and the vertical portion 12*d* of the fitting member 12 are fixed by means of soldering to the circuit board 16. A back side cover 17 is mounted on the upper portion of the circuit accommodation portion 15 via an O-ring 24.

The molded body 14 formed in this manner integrally with the element unit 11 and the fitting members 12 is incorporated into an outer cover 13. The outer cover 13 has a protection cover 25 integrally formed thereon, which covers the portion of the element unit 11 projecting to the outside.

Figure 2:
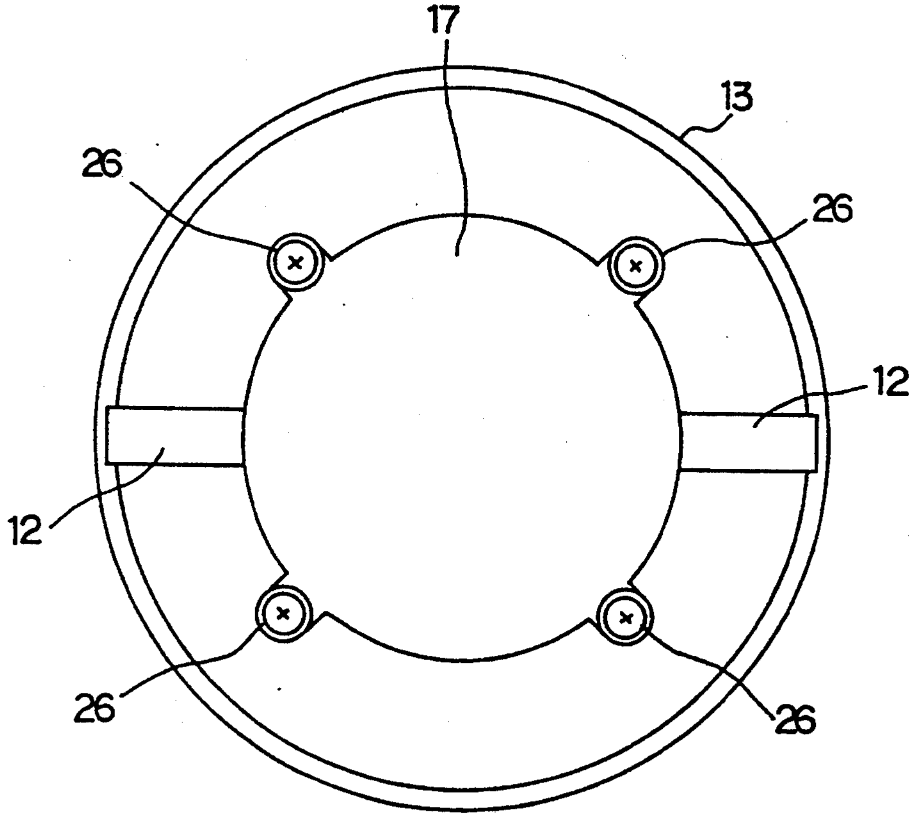
FIG. 2 is a plan view as seen from the ceiling side of FIG. 1.

FIG. 2 is a plan view as seen from the ceiling side of FIG. 1. The back side cover 17 is fixed at four points thereof to the inside of the outer cover 13 by means of screws 26. Further, the fitting members 12 are positioned horizontally from the two sides of the back side cover 17.

Figure 3:
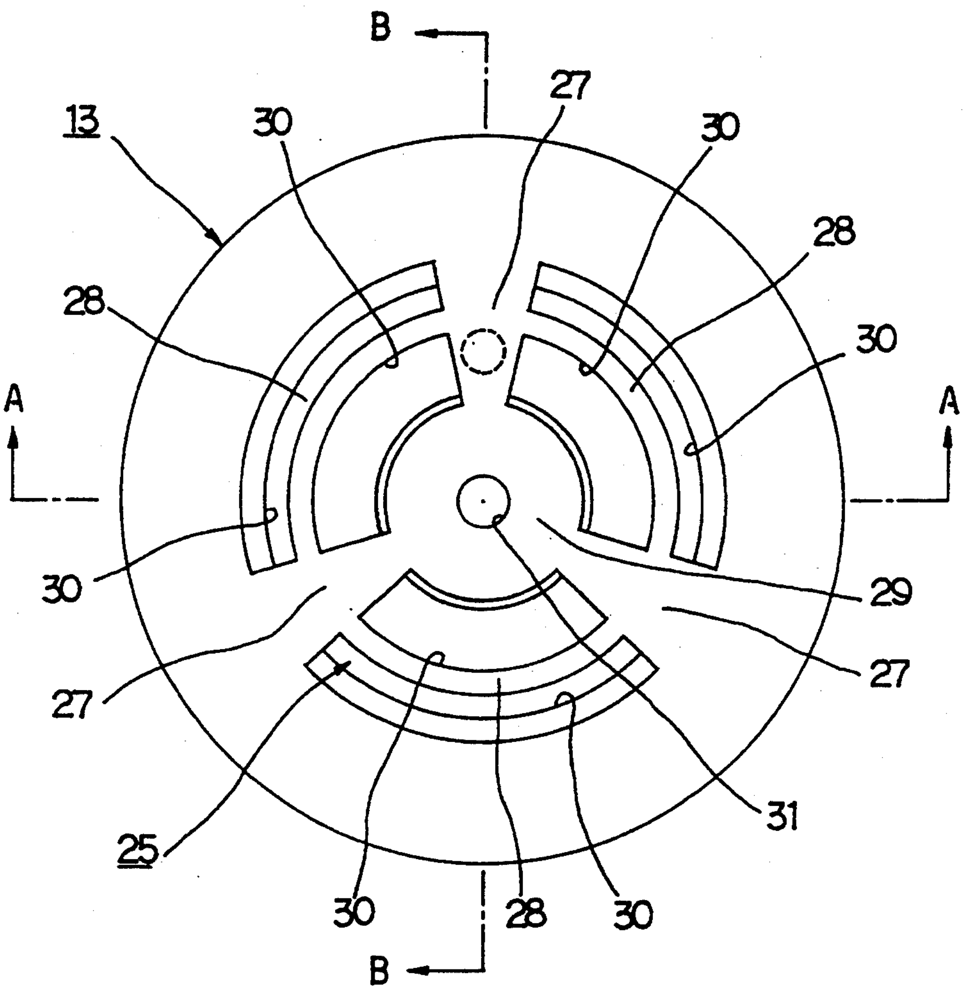
FIG. 3 is a plan view as seen from the floor side of FIG. 1.

FIG. 3 is a plan view as seen from the floor side of FIG. 1.

Referring to FIG. 3, provided integrally on the outer cover 13, are a ring-like frame 28 and a center disc portion 29 which are supported by three arm portions 27. Further, vent holes 30, each separated into two stages of upper and lower, are opened at three points on the side surface thereof, and a vent hole 31 is opened at the center of the central disc portion 29. Here, the section taken along A—A of FIG. 3 is the sectional view of FIG. 1.

Figure 4:
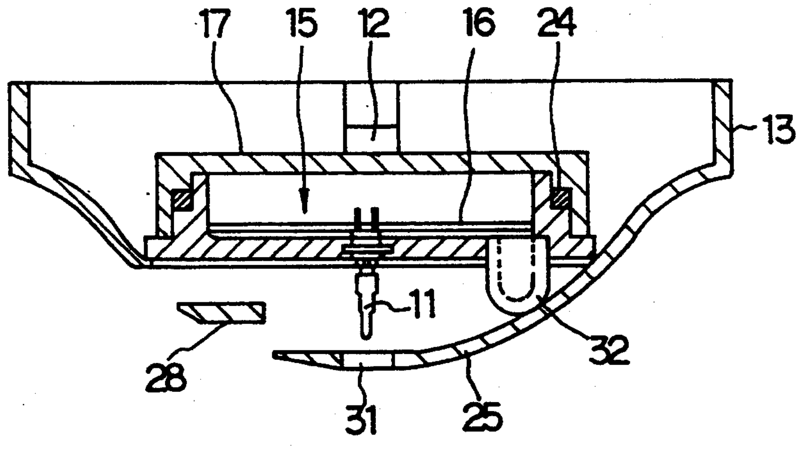
FIG. 4 is a sectional view taken along B—B of FIG. 3.

FIG. 4 is a sectional view taken along B—B of FIG. 3, which makes visible the state of the arm portion 27 extended at the lower portion of the outer cover 13. Further, as shown in the figure, a lamp case 31 which is capable of holding an indication lamp inserted from the circuit accommodation portion 15 side is provided on the inner side of one arm portion 27 of the outer cover 13. Naturally, it is not always necessary to provide the lamp case 32.

Figure 5:
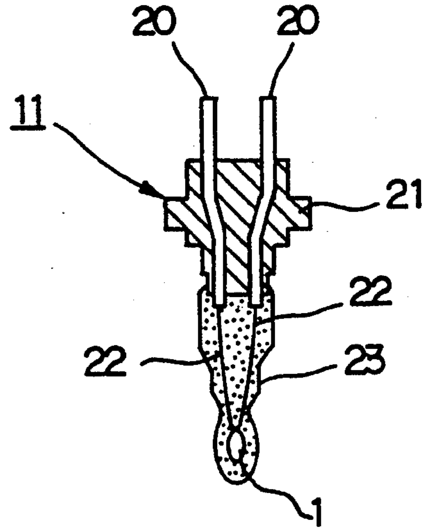
FIG. 5 is a sectional view of an element unit used in the present invention.

FIG. 5 is a sectional view of the element unit 11 as shown in FIGS. 1 and 4.

Referring to FIG. 5, the element unit 11 has a unit body 21. Here, when the unit body 21 is plasstic-formed, two lead frames 20 are integrally plastic-formed thereto by means of insert molding. The lead frames 20 are caused to project to the outside at two ends thereof when they are formed onto the unit body 21, so that the upper portion thereof is a connecting portion to the circuit board 16, while the lower side thereof is a connecting portion to the heat sensor element 1.

Lead wires 22 of the heat sensor element 1 are connected to the lower side of the lead frames 20. Further, a coating member 23 is provided by means of potting of adhesives or the like to cover the entire portion of the heat sensor element 1 and the lead wires 22. Thereby, the heat sensor element 1 and the lead wires 22 are sealed so that they are not exposed to the ambient air.

Further, the unit body 21 is of a shape having a flange at the center portion thereof to secure fixing at the time when it is plastic-formed integrally with the molded body 14, as shown in FIG. 1.

A description will now be given with respect to assembling of the detector of the present invention as shown in FIGS. 1 to 5 and its function at the time of its use.

First, at the time of assembling, the element unit 11 is, as shown in FIG. 5, previously prepared as one component part. Then the element unit 11 as shown in FIG. 5 is set on a mold when the molded body 14 is to be plastic-formed. At the same time, the pair of fitting members 12 are set on the mold. In this state, the insert molding is performed to prepare the molded body la integrally having the element unit 11 and the fitting members 12 as one component part.

Thereafter, assembling work follows, where, as shown in FIG. 1, the circuit board 16 on which implanting of parts has been completed is inserted into the circuit accommodation portion 15 of the molded body 14. Then, the lead frame of the element unit 11 and the vertical portion 12*d* of the fitting member 12 are fitted to the circuit pattern and fix thereto by means of soldering. Then, assembling is completed by fixation to the outer cover 13 as shown in FIG. 2 by means of screws 26 at four points thereof.

In such assembled state, both the element unit 11 and the fitting members 12 facing the circuit accommodation portion 15 are plastic-formed integrally with the molded body 14. Thus, no gap occurs at this portion and entering of moisture from the outside may be almost completely prevented. On the other hand, with respect to the upper side of the circuit accommodation portion 15, airtightness thereof may be securely kept by the construction where the back side cover 17 is fastened thereto via the O-ring 24 by means of screws.

Further, the assembling work is fundamentally consists of assembling of the circuit board 16 and mounting of the back side cover 17 onto the molded body 14. Simple assembling process thus suffices without depending on manual operation, so that automatization of assembling is possible.

Figure 6:
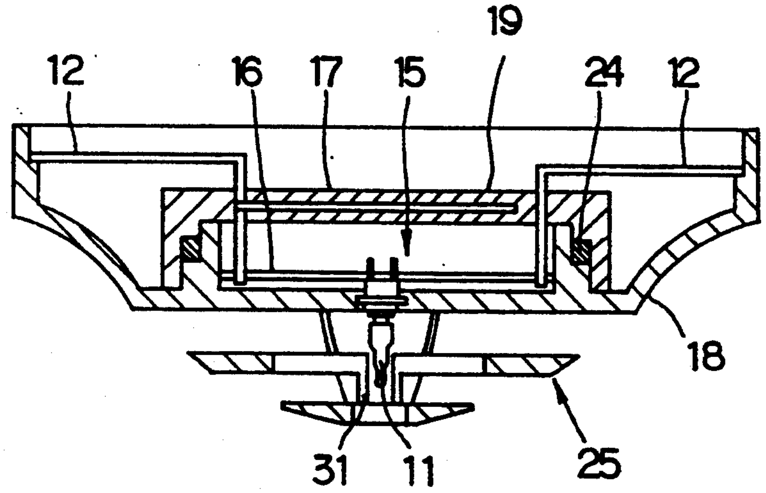
FIG. 6 is a sectional view showing a second embodiment of the present invention.

FIG. 6 shows an exemplary construction of a second embodiment of the present invention, which is characterized in that fitting members 12 are insert-molded into a back side cover in this embodiment.

Referring to FIG. 6, a detector body 18 is of a shape integrally combining the molded body 14 and the outer cover 13, as shown in the embodiment of FIG. 1. An element unit 11 is plastic-formed integrally with the detector body 18 by means of mold forming.

A circuit board 16 on which a sensor circuit is implemented is incorporated into the circuit accommodation portion 15 inside the detector body 18, and the lead frame of the element unit 11 is fixed thereto by means of soldering.

On the other hand, in this embodiment, a pair of fitting members 12 are provided by means of mold-forming integrally with the back side cover 17 which is mounted on the upper portion of the circuit accommodation portion 15 via an O-ring 24. Further, in this embodiment, a disc-like shield plate 19 is embedded by means of mold-forming into the back side cover 17 where it is connected to one of the fitting members 12. This shield plate 19 is provided to effect electrostatic shielding for the circuit board 16 which is incorporated into the circuit accommodation portion 15.

Figure 7:
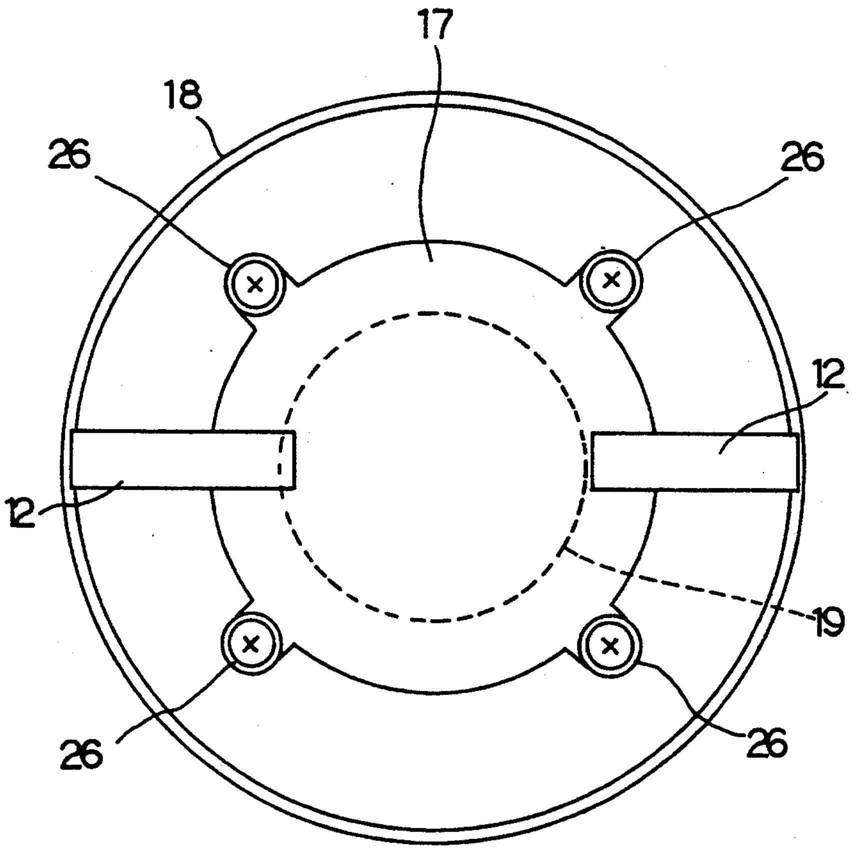
FIG. 7 is a plan view as seen from the ceiling side of FIG. 6.

FIG. 7 is a plan view as seen from the ceiling side of FIG. 6. In this case, the back side cover 17 having the fitting members 12 plastic-formed thereon is fixed at four points thereof to the detector body 18 by means of screws 26. Further, the shield plate 19 is embedded into the back side cover 17 in the state where it is connected to the left side fitting member 12.

In the embodiment of FIGS. 6 and 7, the detector body 18 formed integrally with the element unit 11, comprises one component part. Also, the back side cover 17 formed integrally with the fitting members 12 and the shield plate 19 comprises one component part. Further, since assembling of three components parts including the circuit board 16 in addition to these parts is adequate for the purpose, automatization of assembling thereof is possible and, furthermore, airtightness of the circuit accommodation portion 15 may be substantially completely secured.

It should be noted that, while in the above embodiment the molded body 14 and the outer cover 13 are formed integrally with each other, it is naturally possible similarly, as in the embodiment of FIG. 1 to form the molded body 14 and the outer cover 13 separately and then to combine them with each other.

Figure 8:
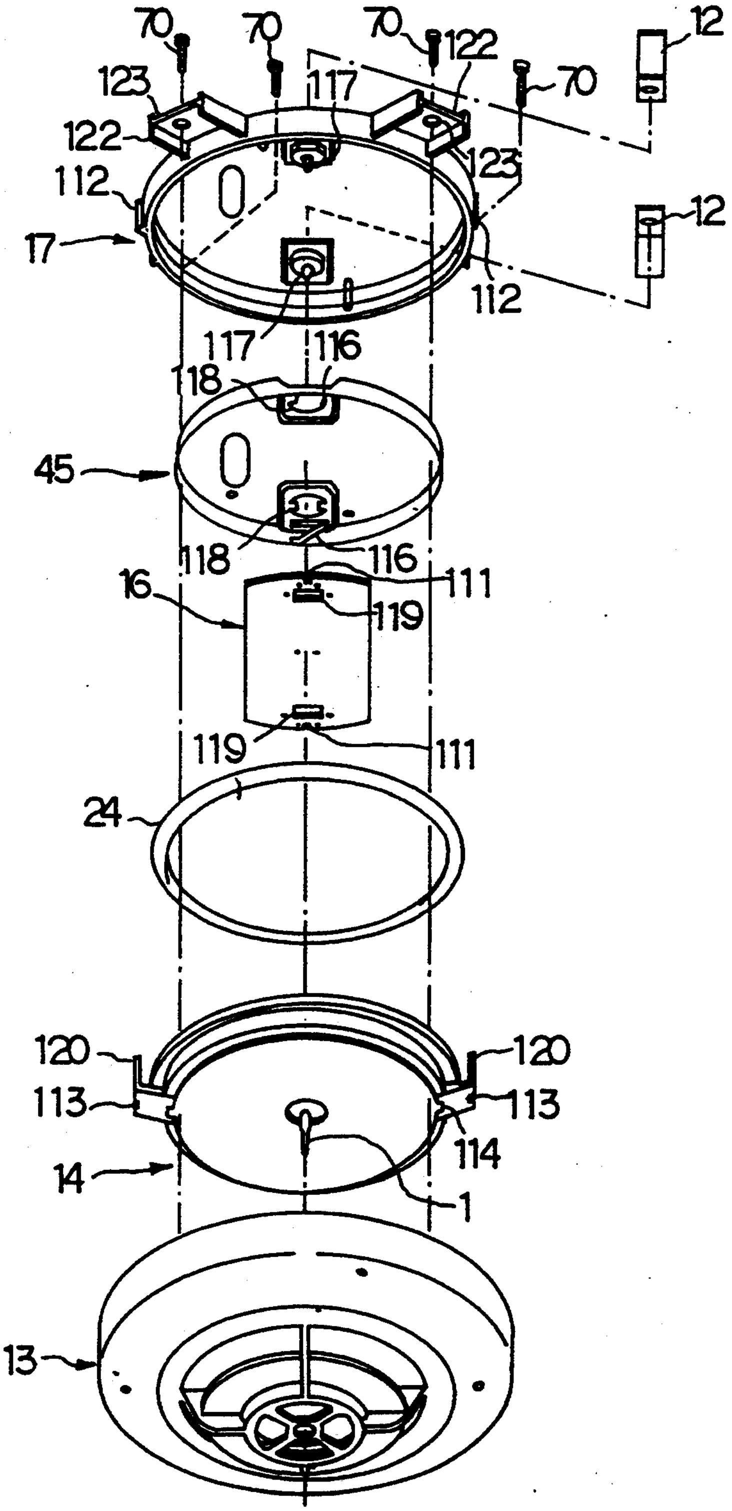
FIG. 8 is an exploded view of an assembly showing a third embodiment of the present invention.

FIG. 8 is an exploded view of the assembly showing a third embodiment of the thermal detector of the present invention.

The present embodiment is characterized in its structure for positioning the respective component parts in the thermal detector.

Referring to FIG. 8, the thermal detector of the present embodiment is constructed by placing an outer cover 13, a molded body 14, an O-ring 24, a circuit board 16, a shield case 45 and a back side cover 17, one upon another in this order from the lower side thereof.

The central lower portion of the molded body 14 has a heat sensor element 1 such as a thermistor integrally formed thereon. Further, a contacting piece 116 is raised on the shield case 45 so that it can electrically contact an earth pattern of the circuit board 16.

Further, a pair of terminal pins 117 are provided on the back side cover 17, and a pair of fitting members 12 are fixed to the upper portion of the terminal pins 117. A through hole 118 is opened at the position of the shield case facing the terminal pin 117 on the back side cover 17. At the portion of the circuit board 16 facing the terminal pin 117 via the through hole 118, a terminal receiver (not shown) for fitting against pushing in of the terminal end of the pin is provided on a pin hole 119 which is opened toward the lower side thereof.

In the present invention, the following positioning structure is provided for a thermal detector formed of the outer cover 13, the molded body 14, the circuit board 16, the shield case 45 and the back side cover 17.

Figure 9:
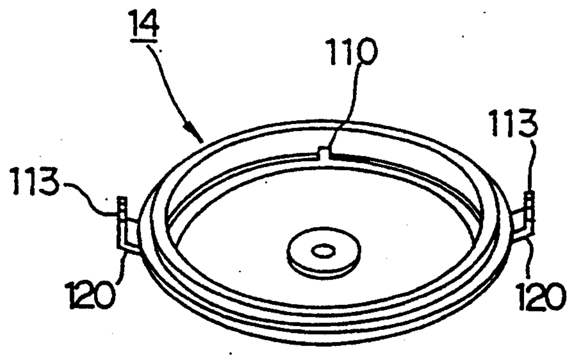
FIG. 9 is a view showing the inside of the body of FIG. 8.

First, as is apparent from the state of the inside shown in FIG. 9, a first positioning projection 110 is provided at two points along the inside of the molded body 14. Corresponding to the first positioning projection 110 on the molded body 14, a first positioning groove 111 is formed at two points on the side surface of the circuit board 16 as shown in FIG. 8. Thus, by fitting the first positioning grooves 111 of the circuit board 16 onto the first positioning projections 110 of the molded body 14, the two may be positioned with respect to each other.

Further, a positioning members 120 is extended at the two sides of the molded body 114. As can be seen from FIG. 2, a second positioning groove 113 having an upward opening is formed on the positioning member 120. Corresponding to the second positioning groove 113 of the molded body 14, a second positioning projection 112 is integrally formed at two points on the side surface of the back side cover 17 as shown in FIG. 8. Thus, by fitting the second positioning grooves of the molded body 14 and the second positioning projections 112 of the back side cover 17 with respect to each other, the two may be positioned at their regular positions.

Figure 10:
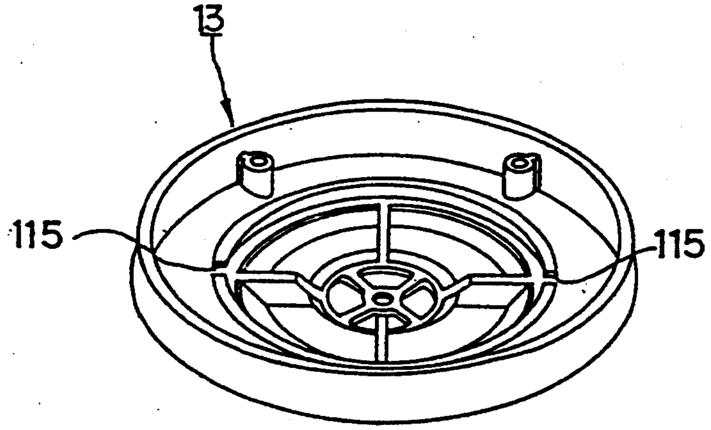
FIG. 10 is a view showing the inside of the outer cover of FIG. 8.
Figure 11:
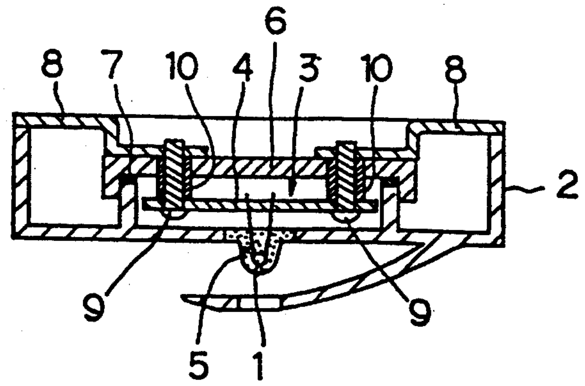
Fig.11 PRIOR ART
FIG. 11 is a sectional view showing a conventional detector structure.

Furthermore, a third positioning projection 114 is provided at the base end portion of each positioning member 120 of the molded body 14. As is apparent from the outer cover 13 of which the inside is shown in FIG. 10, a third positioning groove 115 is formed at two points on the inside of the outer cover 13 corresponding to the third positioning projections 114. Thus, by fitting the third positioning projections 114 into the third positioning grooves 115 at the inside of the outer cover 13, the two may be positioned at their regular positions.

As described, in the present invention, the positioning projections and the positioning grooves are provided, which position the circuit board 16, the back side cover 17 and the outer cover 13 with respect to the molded body 14 so that their relative position becomes of the regular relative position. Thus, by fitting the positioning projections and the positioning grooves, the relative position of the circuit board 16, the back side cover 17 and the outer cover 13 with respect to the molded body 14, may be uniquely determined.

A detailed description will now be given with respect to the assembling process of the thermal detector of the present invention as shown in FIG. 8.

At the time of assembling the thermal detector, the shield case 45 is previously incorporated and fixed to the inside of the back side cover 17, and the fitting member 12 is also previously fixed to the side opposing the terminal pin 117. Further, electric component parts for forming the sensor circuit are previously implanted onto the circuit board 16.

In this condition, at Step 1 of the assembling operation, the first positioning groove 111 on the side surface of the circuit board 16 is fitted onto the first positioning projection 110 on the inside of the molded body 14 as shown in an extracted manner in FIG. 9 to temporarily assemble the circuit board 16 onto the molded body 14.

Next, at Step 2, in the state where the O-ring 24 is fitted onto the upper portion of the molded body 14, the back side cover 17 is assembled thereto, which has the shield case 45 and the fitting member 12 previously assembled thereon. At this time, positioning and temporary assembling of the two sections are performed such than the second positioning groove 113 of the positioning member 120 extended at the side surface of the molded body 14 is fitted onto the second positioning projection 112 on the side surface of the back side cover 17.

Next, at Step 3, the assembly of molded body 14, O-ring 24, circuit board 16, shield case 45, back side cover 17 and fitting member 12 is assembled onto the outer cover 13. At this time, the third positioning projection 113 at the lower portion of the molded body 14 is positioned to the third positioning groove 115 at the inside of the outer cover 13, shown in FIG. 10.

By the above described Steps 1 to 3, a temporarily assembled state of the respective members of outer cover 13, molded body 14, O-ring 24, circuit board 16, shield case as, back side cover 17 and fitting member 12 resulted.

Next, at Step 4, by way of through holes 123 formed at the four extended portions 122 of the back side cover 17, as shown in FIG. 8, tapping screws are screwed into through holes provided on the inside of the outer cover 13 while cutting a thread therein. The back side cover 17 is then fastened with respect to the outer cover 13 to integrally fix molded body 14, O-ring, circuit board 16 and shield case 45 thereto, which are positioned between them.

As described in the present invention, assembling work may be performed by simple operation such that the circuit board 16, the back side cover 17 and the outer cover 13 around the molded body 14 are brought into their temporarily assembled state where they are positioned at their regular positions by fitting of the positioning grooves and the positioning projections, and, at last, they are fixed into one by means of screwing using the tapping screws 70.

It should be noted that the relation of a positioning groove and a positioning projection for positioning the circuit board 16, the back side cover 17 and the outer cover 13 with respect to the molded body 14 in the above embodiment, may be such that one of them is formed on the side of the molded body 14, and the other is formed on the circuit board 16, the back side cover 17 or the outer cover 13. In such case, decision as to on which side the positioning grooves and the positioning projections are respectively provided is not limited by the above embodiment.

What is claimed is:

1. A detector comprising:

an element unit having a heat sensor element sealed into a terminal end portion thereof, for electrically detecting temperature change;

a detector body formed by integrating said element unit by plastic molding with the terminal end of the element unit exposed to the outside of said detector body;

a circuit board having a sensor circuit implemented thereon connected to said element unit mounted on a circuit accommodation portion inside the detector body; and a back side cover for closing and sealing the circuit accommodation portion of said detector body at a back side of said detector body.

2. A detector according to claim 1, wherein said element unit comprises: a pair of lead frames with two ends; a unit body formed of plastic molding so as to expose two ends of said lead frames to the outside; a heat sensor element projected at the terminal end of the unit body and connected to the pair of lead frames by lead wires; and a coating material provided on the terminal end side of said unit body to cover the entire portions of the heat sensor element and the lead wires.

3. A detector according to claim 1, wherein said heat sensor element is a thermistor.

4. A detector comprising:

an element unit having a heat sensor element sealed into a terminal end portion thereof, for electrically detecting temperature change;

a detector body integrating said element unit by plastic molding with the terminal end thereof exposed to the outside of said detector body; and simultaneously integrating by plastic molding a pair of fitting members positioned at the inside of said detector body for electrically and mechanically coupling to a detector base;

a circuit board having a sensor circuit implemented thereon connected to said element unit mounted on a circuit accommodation portion inside the detector body and said fitting members; and a back side cover for closing and sealing the circuit accommodation portion of said detector body at a back side of said detector body.

5. A detector comprising:

an element unit having a heat sensor element sealed into a terminal end portion thereof, for electrically detecting temperature change;

a detector body formed by integrating said element unit by plastic molding with the terminal end of the element unit exposed to the outside of said detector body;

a circuit board having a sensor circuit implemented thereon connected to said element unit mounted on a circuit accommodation portion inside the detector body; and a back side cover integrating by plastic molding a pair of fitting members for electrically and mechanically coupling to a detector base, said back side cover for closing and sealing the circuit accommodation portion of said detector body at a back side of said detector body.

6. A detector according to claim 5, wherein a shield plate electrically connected to one of said fitting members is further embedded into said back side cover by means of plastic molding.

7. An element unit of a thermal detector comprising:

a pair of lead frames with two ends;

a unit body formed of plastic molding so as to expose the two ends of said lead frames to the outside of said unit body;

a heat sensor element projected at a terminal end of the unit body and connected to the pair of lead frames by lead wires; and a coating material provided on the terminal end side of said unit body to cover the entire portions of the heat sensor element and the lead wires.

8. An element unit of a thermal detector according to claim 7, wherein said unit body has a flange at a periphery of a center portion of said unit body.

* * * * *